Feb. 12, 1929.
C. F. UWINS
1,702,184
CONTROL GEAR FOR AIRCRAFT
Filed March 31, 1927
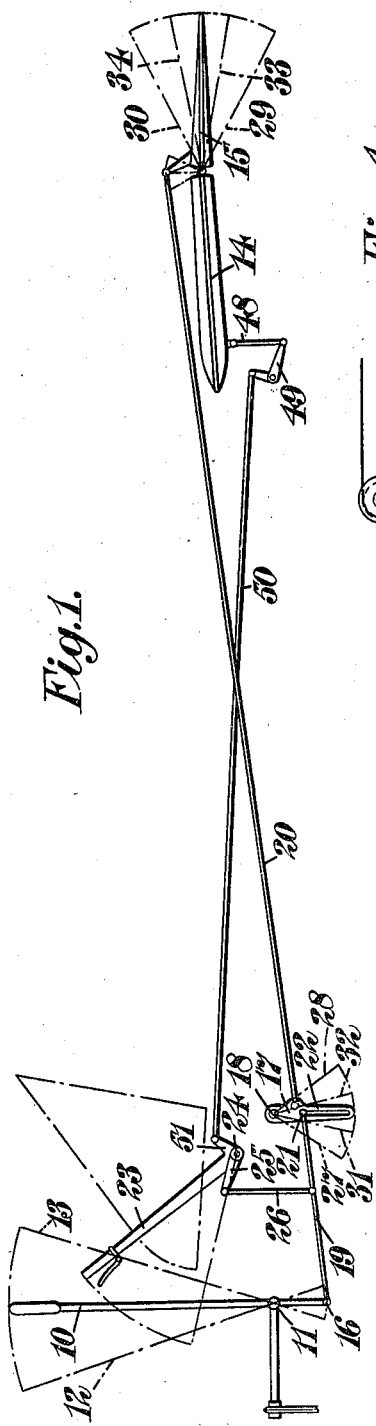
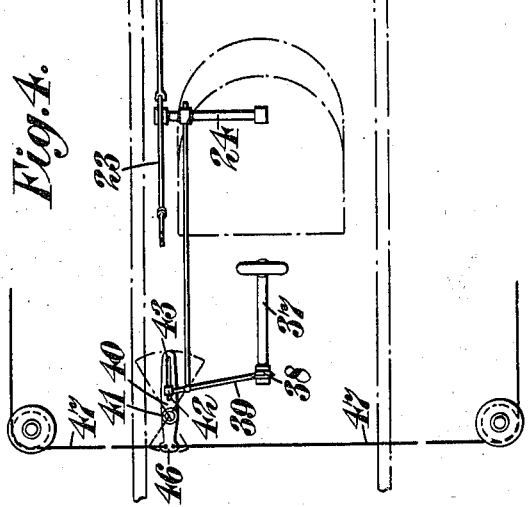
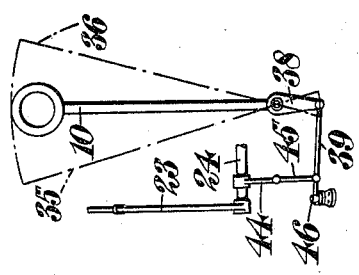
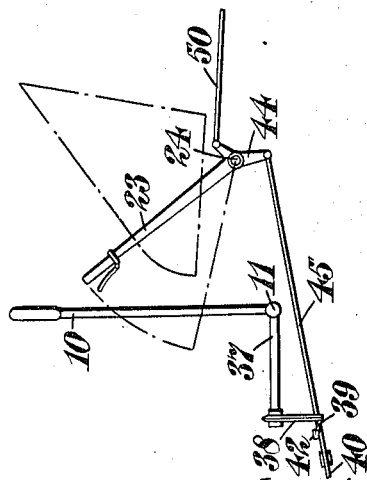
Inventor
Cyril F. Uwins
by Wilkinson & Giusta
Attorneys Patented Feb. 12, 1929.

1,702,184

UNITED STATES PATENT OFFICE.

CYRIL FRANK UWINS, OF CLIFTON, BRISTOL, ENGLAND, ASSIGNOR TO THE BRISTOL AEROPLANE COMPANY LIMITED, OF BRISTOL, ENGLAND, A BRITISH COMPANY.

CONTROL GEAR FOR AIRCRAFT.

Application filed March 31, 1927, Serial No. 180,024, and in Great Britain February 1, 1927.

This invention is for improvements in or relating to the control-gear for aircraft, and has for its object to provide an improved construction of the mechanism whereby the pilot operates the adjustable aerofoils, such as the ailerons or elevator, with a view to relieving the loads to be applied by the pilot in controlling the machine, and to causing a more positive response of the machine to its controlling surface or surfaces under various conditions.

In the arrangement usually used, the elevator and ailerons are operated by a universally-jointed control-column, the angular movement of the aerofoils being proportional to the angular movement of the control-column. It has heretofore been customary so to connect these parts that the velocity ratio is fixed, the value selected being a suitable compromise for the various conditions of use. Thus, when the machine is travelling at low speeds it is necessary to impart a considerable angular movement to an aerofoil and the velocity ratio had to be such as to give this movement of the aerofoil without excessive movement of the control-column. Conversely, at high speeds it is necessary only to impart a very small movement to the aerofoil since the increased air pressure on the aerofoil gives a greater controlling effect. This increased air pressure, however, also results in a greater load being imposed upon the aerofoil, so that the force exerted by the pilot had to be greater. Another difficulty arises from the possibility of the pilot over-controlling the machine when travelling at very high speeds, through imparting too great an extent of movement to the adjustable aerofoils.

According to this invention there is provided in or for an aircraft, the combination with an adjustable aerofoil (for example the elevator or ailerons) and the means for controlling it (for example the control-column), of means for varying the velocity ratio of the mechanism operatively connecting them. With such a construction the pilot can adjust the controlling mechanism so that when travelling at low speeds a given movement of the control-column produces a movement of the aerofoil suitable to that speed, or alternatively, when travelling at high speeds the same movement of the control-column produces a much less movement of the control surfaces, which lesser movement is appropriate at the high speed.

According to another feature of this invention the means connecting the adjustable aerofoil and its controlling means may comprise a pivoted lever, members connecting this lever to the aerofoil and its controlling means, and means for adjusting the point of connection of either or both of said members to the pivoted lever towards or away from the pivotal axis of that lever.

Some aircraft are provided with means for adjusting the angle of incidence of the tail-plane so that it can be adjusted to suit various speeds of flight, and when the present invention is applied to such a machine it is preferred to interconnect the adjusting means forming the subject of this invention with the tail adjusting device so that only one adjustment is required to be made by the pilot. Also, in machines in which the tail-adjustment is not provided, it is preferred to arrange the controls for the adjustment forming the present invention to be similar in form to that used for the tail-adjustment, so that a pilot familiar with the tail-adjustment will readily adapt and use the further adjustment provided by this invention.

In the accompanying drawings, the adjustment for the elevator has been illustrated separately from the adjustment for the ailerons, but it will be appreciated that they will normally both be applied to the control-column, which of course is common to the two constructions illustrated.

In the drawings—

Figure 1 is a side elevation showing diagrammatically a construction according to the present invention for varying the gear-ratio of the connection between the control-column and the elevator;

Figures 2, 3 and 4 are respectively a side elevation, front elevation and plan showing diagrammatically a construction for varying the gear-ratio between the control-column and the ailerons.

Like reference characters indicate like parts throughout the figures.

Referring first to Figure 1, the control-column indicated at 10 is mounted on a universal joint 11 so that it can be swung in any direction, but this part of the invention is concerned only with the fore and aft swing, that is to say, swinging in the plane of the paper.

The convenient range of movement is indicated between the lines 12, 13. The tail-plane is indicated at 14 with the elevator 15 pivotally mounted thereon in the usual manner, and in the usual form of control, the lower end 16 of the control-column is directly connected to an arm on the elevator so as to swing it. According to the present invention, however, there is provided a lever 17 pivoted at any convenient position 18 in the machine, and this lever is connected by rods 19, 20 to the lower end 16 of the control-column and the elevator respectively. In the particular construction illustrated the rod 20 is engaged with the lever 17 in a non-adjustable manner, but the rod 19 engages a block or pin 21 which can slide along a slot 22 towards or away from the pivotal axis 18 of the lever 17. Its position in the slot is controlled by means of a suitable hand-lever 23 which is mounted on a shaft 24 carrying an arm 25 connected by a link 26 to the rod 19; the parts are so disposed that angular movement of the hand-lever 23 swings the rod 19 about its connection to the control-column at 16 and moves its other end 21 along the slot 22.

Assuming that the various parts are in the position shown in Figure 1, an angular movement of the control-column 10 between the positions indicated by the lines 12, 13 will impart such a movement to the rod 19 as will cause the lever 17 to swing between the positions indicated by the lines 27, 28, and this movement in turn imparts to the elevator 15 a movement whose range is indicated by the lines 29, 30.

If now the pin or block 21 be moved to the other end of the slot 22, so that it is at its maximum distance from the pivotal axis 18 of the lever 17, the same movement of the control-column 10, and the same movement of the rod 19 will impart to the lever 17 a considerably smaller angular movement, as indicated by the lines 31, 32, and this smaller angular movement of the lever 17 will impart a correspondingly smaller angular movement to the elevator 15 as indicated by the lines 33, 34. In other words the velocity ratio or leverage of the controlling mechanism for the elevator has been changed, and it will be appreciated that what is lost in the range of movement of the aerofoil by such adjustment is gained in the force which is exerted by the pilot, for the same force applied to the control-column will overcome a bigger load on the elevator when it is moved through a smaller distance.

Turning now to Figures 2, 3 and 4, which illustrate the means for adjusting the aileron control, the control-column 10, 11, hand lever 23 and shaft 24 are the same parts as appear in Figure 1, but in this case it is only lateral movements of the control-column which need be considered, as shown in Figure 4; the range of movement is indicated by the lines 35, 36.

The control-column is secured to a shaft 37 which it rotates by means of its lateral movements aforesaid, and this shaft carries an arm 38 which is coupled by a rod 39 to a lever 40 pivoted at 41 on any convenient part of the machine. The rod 39 is adjustably engaged with the lever 40 by a slide-block or pin 42 movable in a slot 43 towards and away from the pivotal axis of the lever, and its position in the slot 43 is controlled by means of the hand lever 23, and shaft 24, this shaft carrying an arm 44 which is connected by a rod 45 to the rod 39. The other end 46 of the lever 40 is connected in the usual way as by cables 47 to the ailerons to control them. The parts are so arranged that the adjusting movement of the hand-lever 23 in respect of the mechanism of Figure 1 operates to make a similar adjustment in respect of the mechanism illustrated in Figures 2, 3 and 4, so that it need not be repeated in detail.

Returning now to Figure 1, there is also shown in this figure the mechanism for adjusting the incidence of the tail-plane hereinbefore referred to. This is effected by providing a hinge-axis at the rear edge of the tail-plane 14 and supporting it, forward of its hinge-axis, by a link 48 connected through a bell-crank lever 49 and rod 50, to an arm 51, carried on the hand-lever 23 or the shaft 24, which is engaged therewith. The movement of the hand-lever 23 which sets the control-mechanism for high or low speeds respectively, simultaneously effects the corresponding adjustment of the tail-plane 14.

Whilst a particular construction and arrangement of mechanism has been described in detail, it will be appreciated that the invention is not limited to such an arrangement, for various modifications may be made without departing from the scope of the invention. Thus, for example, the mechanism illustrated effects the control through rods which will transmit either a push or a pull, and these could be replaced by cables or other flexible means which transmit only a pull. Also, it will be understood that other arrangements could be used for varying the velocity-ratio of the mechanism, such for example as adjusting the point of connection 16 of the rod 19 towards or away from the pivotal axis of the control-column, or adjusting the position of the pivotal axis of the control-column 10 with respect to its length, so as to change the ratio of the length of the upper and lower parts of the column, and all such modifications are held to lie within the scope of the present invention.

I claim:—

1. In an aircraft, the combination of an adjustable elevator, a controlling member therefor, variable velocity-ratio connecting means connecting said elevator to said controlling member, an adjustable tail plane, and a unitary control device operatively connected to said connecting means and to said tail plane for adjusting at will and during flight the velocity ratio of the said connecting means and the position of the said tail plane.

2. In an aircraft, the combination of an adjustable elevator, a controlling member therefor, a pivoted lever, members connecting said elevator and said controlling member to said pivoted lever, one of the connecting members being adjustable on said pivoted lever in relation to the pivotal axis thereof, an adjustable tail plane, a control lever and members connecting said control lever to said tail plane and to said adjustable connecting member, said control lever thereby serving to control simultaneously the velocity-ratio of movements of the said controlling member and the said elevator and the adjustment of the tail plane.

In testimony whereof I affix my signature.

CYRIL FRANK UWINS.